United States Patent
Li

(10) Patent No.: US 12,367,705 B2
(45) Date of Patent: Jul. 22, 2025

(54) OCCLUSION DETECTION

(71) Applicant: Shanghai Bilibili Technology Co., Ltd., Shanghai (CN)

(72) Inventor: Dianbo Li, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 378 days.

(21) Appl. No.: 18/124,166

(22) Filed: Mar. 21, 2023

(65) Prior Publication Data
US 2023/0237841 A1 Jul. 27, 2023

Related U.S. Application Data

(63) Continuation of application No. PCT/CN2021/112308, filed on Aug. 12, 2021.

(30) Foreign Application Priority Data

Oct. 16, 2020 (CN) .......................... 202011111254.2

(51) Int. Cl.
G06V 40/16 (2022.01)
G06V 10/26 (2022.01)
G06V 10/774 (2022.01)
G06V 10/82 (2022.01)

(52) U.S. Cl.
CPC ............ G06V 40/171 (2022.01); G06V 10/26 (2022.01); G06V 10/774 (2022.01); G06V 10/82 (2022.01)

(58) Field of Classification Search
None
See application file for complete search history.

(56) References Cited

U.S. PATENT DOCUMENTS

2019/0080149 A1* 3/2019 Gernoth .............. G06V 40/166
2019/0371080 A1 12/2019 Sminchisescu et al.

FOREIGN PATENT DOCUMENTS

| CN | 105095856 A | 11/2015 |
| CN | 107679490 A | 2/2018 |
| CN | 108932693 A | 12/2018 |

(Continued)

OTHER PUBLICATIONS

International Search Report, with a mailing date of Nov. 12, 2021, in International application No. PCT/CN2021/112308, filed on Aug. 12, 2021 (4 pages).

(Continued)

Primary Examiner — Leon Flores
(74) Attorney, Agent, or Firm — MCANDREWS HELD & MALLOY, LTD

(57) ABSTRACT

An occlusion detection model training method is provided. The training method includes the following steps: constructing a plurality of pieces of training sample data, where the training sample data includes a first face image added with an occlusion object, coordinate values of a first key point in the first face image, and occlusion information of the first key point; and using the first face image as input data, and using the coordinate values of the first key point and the occlusion information of the first key point as output data, to train an occlusion detection model, so that the occlusion detection model outputs, based on any input second face image, coordinate values of a second key point included in the second face image and an occlusion probability of the second key point.

18 Claims, 7 Drawing Sheets

Construct a plurality of pieces of training sample data, where the training sample data includes a first face image added with an occlusion object, coordinate values of a first key point in the first face image, and occlusion information of the first key point — S100

Use the first face image as input data, and use the coordinate values of the first key point and the occlusion information of the first key point as output data, to train an occlusion detection model, so that the occlusion detection model outputs, based on any input second face image, coordinate values of a second key point included in the second face image and an occlusion probability of the second key point — S200

(56) References Cited

FOREIGN PATENT DOCUMENTS

| CN | 109960974 A | 7/2019 |
|---|---|---|
| CN | 110728330 A | 1/2020 |
| CN | 110826519 A | 2/2020 |
| CN | 111027504 A | 4/2020 |
| CN | 112419170 A | 2/2021 |

OTHER PUBLICATIONS

Lv, Jiang-Jing et al., "Data augmentation for face recognition," Neurocomputing 230 (2017) 184-196 (13 pages).

Lee, Yu-Hui et al., "ByeGlassesGAN: Identity Preserving Eyeglasses Removal for Face Images," Department of Computer Science, National Tsing Hua University, Taiwan; Microsoft AI R&D Center, Taiwan Aug. 25, 2020 (16 pages).

* cited by examiner

OCCLUSION DETECTION

CROSS-REFERENCE TO RELATED APPLICATIONS

This application is a continuation under 35 U.S.C. 111(a) of PCT International Application No. PCT/CN2021/112308, filed on Aug. 12, 2021, which claims priority to Chinese Patent Application No. 202011111254.2, filed on Oct. 16, 2020, the entire contents of which are hereby incorporated by reference in their entirety for all purposes.

TECHNICAL FIELD

This application relates to image processing technologies, and in particular, to occlusion detection.

BACKGROUND

Currently, a detection technology for a key point in a face image is increasingly developed. A conventional SDM, a 3000FPS method, and a recently developed key point detection method based on deep learning have reached new heights in terms of a detection speed and precision.

SUMMARY

According to some embodiments, this application provides an occlusion detection model training method, including:
constructing a plurality of pieces of training sample data, where the training sample data includes a first face image added with an occlusion object, coordinate values of a first key point in the first face image, and occlusion information of the first key point; and
using the first face image as input data, and using the coordinate values of the first key point and the occlusion information of the first key point as output data, to train an occlusion detection model, so that the occlusion detection model outputs, based on any input second face image, coordinate values of a second key point included in the second face image and an occlusion probability of the second key point.

Based on the occlusion detection model training method provided in this application, the constructing a plurality of pieces of training sample data includes:
obtaining an original face image that does not include the occlusion object;
obtaining an original occlusion object image that includes the occlusion object, and extracting a target occlusion object from the original occlusion object image;
synthesizing the target occlusion object and the face image, to obtain the first face image added with the occlusion object; and
recording the coordinate values of the first key point in the first face image and occlusion information of each first key point.

Based on the occlusion detection model training method provided in this application, the obtaining an original occlusion object image that includes the occlusion object, and extracting a target occlusion object from the original occlusion object image includes:
obtaining a segmentation contour of the target occlusion object based on an image segmentation technology; and
performing convolution calculation by using the segmentation contour and the original occlusion object image, to obtain the target occlusion object.

Based on the occlusion detection model training method provided in this application, the synthesizing the target occlusion object and the face image, to obtain the first face image added with the occlusion object includes:
selecting a first object from the target occlusion object;
selecting a second object from any position in the face image, where a size and a shape of the second object are the same as those of the first object; and
replacing a pixel value of a corresponding pixel in the second object with a pixel value of each pixel included in the first object.

Based on the occlusion detection model training method provided in this application, the synthesizing the target occlusion object and the face image, to obtain the first face image added with the occlusion object includes:
selecting a target object from the occlusion object image, and performing random transformation on the target object, to obtain a first object;
selecting a second object from any position in the face image, where a size and a shape of the second object are the same as those of the first object; and
replacing a pixel value of a corresponding pixel in the second object with a pixel value of each pixel included in the first object.

Based on the training method provided in this application, the constructing a plurality of pieces of training sample data includes:
obtaining a third face image that is marked with a key point and that does not include an occlusion object, and a fourth face image that is not marked with a key point and that includes an occlusion object;
extracting a key point feature from the third face image by using a first encoder;
extracting an appearance feature from the fourth face image by using a second encoder, where the apparent feature includes an occlusion object feature; and inputting the key point feature and the appearance feature into a decoder, and generating the first face image by using the decoder.

Based on the training method provided in this application, the first encoder, the second encoder, and the decoder are obtained by training through:
extracting a target key point feature from the third face image by using the first encoder;
extracting a target appearance feature from the third face image by using the second encoder;
inputting the target key point feature and the target appearance feature into the decoder, and generating a target face image by using the decoder;
using the third face image as truth value data, and determining a loss function between the target face image and the truth value data; and
performing reverse training on the first encoder, the second encoder, and the decoder based on the loss function.

Based on the occlusion detection model training method provided in this application, the using the first face image as input data, and using the coordinate values of the first key point and the occlusion information of the first key point as output data, to train an occlusion detection model includes:
training a first neural network, so that the first neural network outputs coordinate values of a predicted key point based on the input first face image;
selecting output of a hidden layer in the first neural network, using the output of the hidden layer as input, to train a second neural network, and outputting an occlusion probability of the predicted key point;

determining a first loss function of the first neural network based on the coordinates of the predicted key point and the coordinate values of the first key point, and determining a second loss function of the second neural network based on the occlusion probability of the predicted key point and the occlusion information of the first key point;

determining a comprehensive loss function of the occlusion detection model based on the first loss function and the second loss function; and performing reverse training based on the comprehensive loss function, to determine an occlusion parameter in the model.

Based on the occlusion detection model training method provided in this application, an expression of the comprehensive loss function is:

$$\text{loss} = \lambda 1 * \sum_{i}^{n} \sqrt{p_i} * l_i + \lambda 2 * o_i$$

$p_i$ represents an occlusion probability of an $i^{th}$ predicted key point, $l_i$ represents the first loss function of the first neural network, $o_i$ represents the second loss function of the second neural network, and $\lambda_1$ and $\lambda_2$ respectively represent empirical parameters.

According to some embodiments, this application further includes:

obtaining a fifth face image to be processed;

inputting the fifth face image into the foregoing occlusion detection model, and outputting coordinate values of a fifth key point in the fifth face image and an occlusion probability of the fifth key point; and performing beautification processing on the face image based on the occlusion probability.

According to some embodiments, this application further provides a computer device, including a memory, a processor, and computer-readable instructions that are stored in the memory and that are capable of being run by the processor, wherein when executing the instructions, the processor perform operations according to the above method.

According to some embodiments, this application further provides a non-transitory computer-readable storage medium. The non-transitory computer-readable storage medium stores computer-readable instructions, which when executed by a processor, cause the processor to perform operations according to the above method.

DETAILED DESCRIPTION OF EMBODIMENTS

To make the objectives, technical solutions, and advantages of this application clearer and more comprehensible, the following further describes this application in detail with reference to the accompanying drawings and embodiments. It should be understood that the some embodiments described herein are merely used to explain this application but are not intended to limit this application. All other embodiments obtained by a person of ordinary skill in the art based on the embodiments of this application without creative efforts shall fall within the protection scope of this application.

For the detection technology for a key point in a face image, the inventor finds that existing face key point detection is performed based on that the face image does not include any occlusion object. In a case in which the occlusion object is included, in the conventional technology, the occlusion object cannot be accurately determined. Consequently, accuracy of the face key point detection is affected.

An objective of this application is to provide a technical solution that can accurately determine whether a key point in a face image is occluded, to resolve the foregoing problem in the conventional technology.

Figure 1:
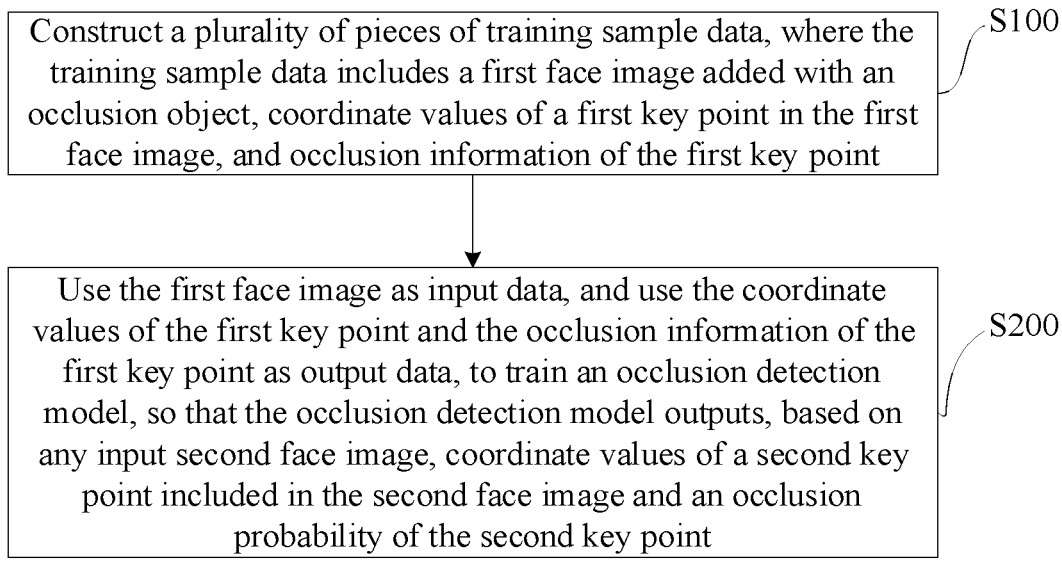
FIG. 1 is a flowchart of an occlusion detection model training method according to some embodiments of this application.

Referring to FIG. 1, some embodiments of this application provide an occlusion detection model training method, including the following steps:

S100: Construct training sample data, where the training sample data includes a first face image added with an occlusion object, coordinate values of a first key point in the first face image, and occlusion information of the first key point.

Currently, a quantity of disclosed face image key point data sets is limited, and a case in which an occlusion object is included is excessively rare. However, in actual life, people often wear protective products such as a hat, glasses, and a mask when photographing an image. These protective products may cause occlusion to a specific key point in a face. An existing key point detection technology cannot distinguish the occlusion, and a corresponding facial feature key point may still be recognized in a position of the protective product. Consequently, a recognized face image does not correspond to a real situation. In addition, some existing facial beautification functions or makeup functions can perform beautification processing such as color enhancement and contour modification on a detected face key point. If an occlusion object in a face image cannot be accurately recognized, a strange effect of adding lipstick over the mask may occur, causing poor user experience. Therefore, in this step, the first face image added with the occlusion object may be constructed based on an existing face image. A key point in the first face image does not change compared with that in the existing face image. Therefore, coordinate values of the key point in the existing face image, that is, the coordinate values of the first key point in the first face image, may be determined by using any existing key point detection technology. The occlusion object may be added to any position in the face image, and then occlusion information of the first key point in the first face image is marked based on an adding position. The occlusion information may include unoccluded (set as 0) and occluded (set as 1). It is assumed that the first key point includes a left corner of a mouth, the occlusion object is a mask, and the adding position is a face area below an eye in the face image. In this way, occlusion information of the left corner of the mouth is occluded. Alternatively, when the first key point is an end of a left eyebrow, apparently, occlusion information of the end of the left eyebrow is unoccluded.

S200: Use the first face image as input data, and use the coordinate values of the first key point and the occlusion information of the first key point as output data, to train an occlusion detection model, so that the occlusion detection model outputs, based on any input second face image, coordinate values of a second key point included in the second face image and an occlusion probability of the second key point.

On a basis that the training sample data is obtained, machine learning training may be performed based on the training sample data by using any existing neural network model. For example, for a mobile terminal, a model such as MobileNet or ShuffleNet may be selected, and for a cloud terminal, a model such as ResNet or Inception may be selected. A model selection may be determined based on different requirements of an application scenario. This is not limited in this application.

The first face image in the training sample data is input into the occlusion detection model, so that the occlusion detection model predicts coordinate values of each key point included in the first face image and a probability of whether the key point is occluded. The probability may be any value between [0, 1], and a larger value indicates a larger probability of being occluded. The coordinate values of the first key point and the occlusion information of the first key point may be used as truth value data, to calculate loss functions corresponding to the coordinate values of each key point and the occlusion probability of the key point that are predicted by the occlusion detection model. The loss function may be selected as, for example, MSE Loss or Wing Loss. Any existing optimization algorithm, for example, a gradient descent method or an adaptive moment estimation method may be used to minimize the loss function, and to determine an occlusion parameter of the occlusion detection model, such as a weight value corresponding to each neuron.

Through the foregoing steps, a stable and ideal occlusion detection model may be obtained. The model can, for any input face image, automatically predict the coordinates of the key point and the occlusion probability of the key point.

In the occlusion detection model training method according to some embodiments of this application, whether the key point in the face image is occluded can be accurately recognized, and based on this, corresponding beautification processing is performed on the face image. In this application, a face image added with an occlusion object is constructed based on an existing single face image and a single occlusion object image, and a key point position in the face image with the occlusion object and whether each key point is occluded are marked. A neural network model is trained by using the constructed face image with the occlusion object and corresponding marking data, to obtain the occlusion detection model that can accurately predict whether a key point in a face is occluded. Further, corresponding beautification processing is performed on different positions of the face image by using a detection result of the occlusion detection model. This can effectively improve accuracy and authenticity of face image recognition, and improve user experience.

Figure 2:
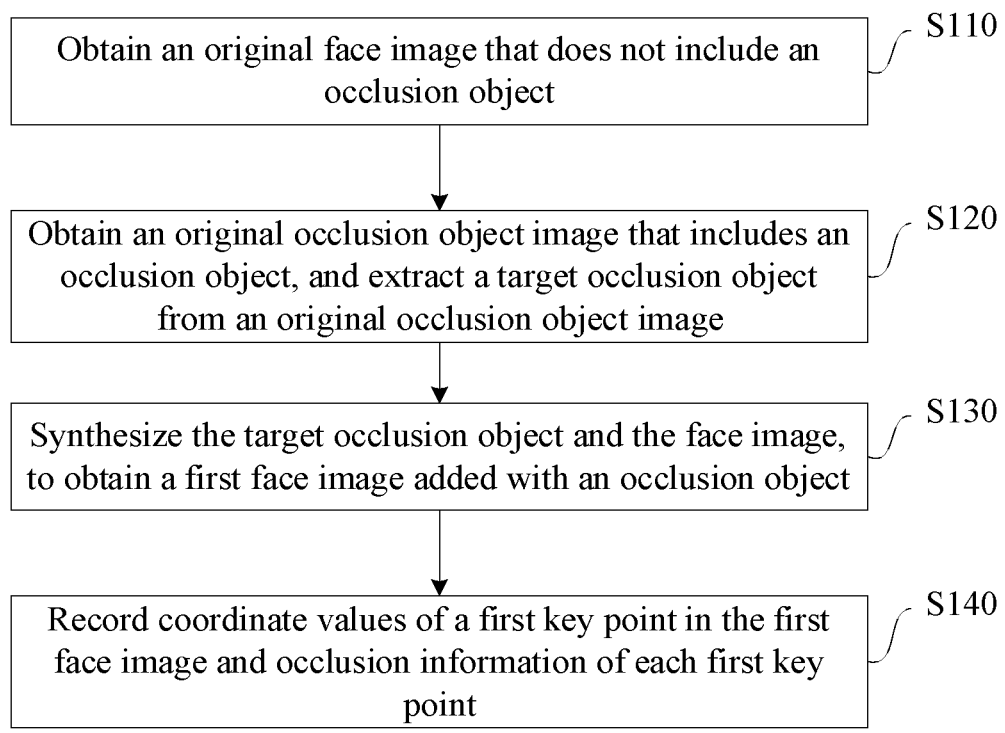
FIG. 2 is a schematic flowchart of constructing training sample data according to some embodiments of this application.

FIG. 2 is a schematic flowchart of constructing training sample data according to some embodiments of this application. As shown in FIG. 2, constructing the training sample data in step S100 includes:

S110: Obtain an original face image that does not include an occlusion object.

The original face image may include a plurality of pixels, and each pixel has a corresponding pixel value, for example, a color value formed by RGB. In this way, the original face image may be represented as a matrix, and each element in the matrix corresponds to one pixel.

S120: Obtain an original occlusion object image that includes the occlusion object, and extract a target occlusion object from the original occlusion object image.

For ease of calculation, a size of the original occlusion object image may be the same as a size of the original face image, that is, includes a same quantity of pixels. Correspondingly, the original occlusion object image may also be represented as a matrix.

It may be understood that a large quantity of background information in addition to the target occlusion object may exist in the original occlusion object image directly photographed by a photographing apparatus. In this step, background information in the original occlusion object image may be deleted by using an existing computer vision technology, to extract a pure target occlusion object without interference.

In an example, an image segmentation technology, for example, a deep learning network such as Mask R-CNN or DeepLab or a conventional graphcut method may be used to segment the original occlusion object image to obtain a segmentation contour (Mask). The segmentation contour is used to distinguish between a foreground and a background in the original occlusion object image. According to some embodiments, an area in which the target occlusion object is positioned is used as the foreground, and the other area is used as the background. It should be noted that the segmentation contour only performs a simple binary segmentation on a profile of the target occlusion object. For example, a pixel value in the foreground is set as 1 (that is, pure white), and a pixel value in the background is set as 0 (that is, pure black).

It may be understood that a color of a real target occlusion object may not necessarily be pure black. Therefore, in this step, convolution calculation is performed by using the segmentation contour and the original occlusion object image, to obtain the target occlusion object, that is, to obtain a real pixel value corresponding to each pixel in the target occlusion object.

S130: Synthesize the target occlusion object and the face image, to obtain the first face image added with the occlusion object.

Figure 3:
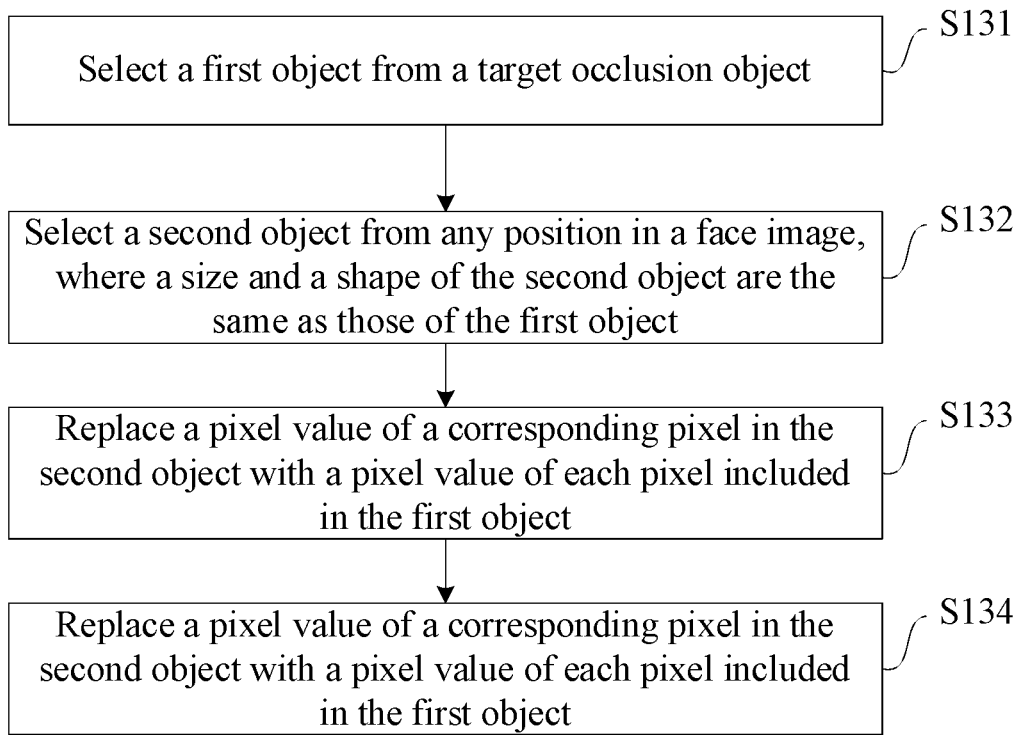
FIG. 3 is a schematic flowchart of synthesizing a first face image according to some embodiments of this application.

FIG. 3 is a schematic flowchart of synthesizing a first face image according to some embodiments of this application. As shown in FIG. 3, step S130 includes:

S131: Select a first object from the target occlusion object. The first object may include all or a part of pixels in the target occlusion object.

To increase data diversity, affine transformation such as translation, scaling, flipping, rotating, and shearing may further be performed on the first object, to obtain first objects in different states.

S132: Select a second object from any position in the face image, where a size and a shape of the second object are the same as those of the first object. For example, if the shape of the first object is an ellipse and includes M pixels, the second object also needs to be an ellipse and include M pixels.

It should be noted that, in a case in which affine transformation is performed on the first object, the size and the shape of the second object need to be the same as a size and a shape of a transformed first object.

S133: Replace a pixel value of a corresponding pixel in the second object with a pixel value of each pixel included in the first object.

Generally, a color of the target occlusion object is different from a skin color of a face. It may be understood that the pixel value of the corresponding pixel in the second object is set as a pixel value of a pixel in the first object, so that an effect of the first object occluded on the face image is visually achieved.

It is assumed that an original face image marked with the key point is represented as A, the original occlusion object image is represented as I, the segmentation contour is represented as M, and the target occlusion object is represented as Z=I*M. It is assumed that affine transformation is performed on Z to obtain Z', and affine transformation is correspondingly performed on M to obtain M'. It may be understood that a first face image B finally obtained after affine transformation may be represented as B=A*(1−M')+Z'.

S140: Record the coordinate values of the first key point in the first face image and occlusion information of each first key point.

The coordinate values of the first key point are determined in advance, and the occlusion information of the first key point is determined based on an area range of the second object. For example, occlusion information of a first key point that falls within the area range of the second object is occluded (set as 1), and occlusion information of a first key point that falls beyond the area range of the second object is unoccluded (set as 0).

Through the foregoing steps, the first face image added with the occlusion object may be obtained. This helps to provide rich training sample data, so that accuracy of the occlusion detection model is improved.

Figure 4:
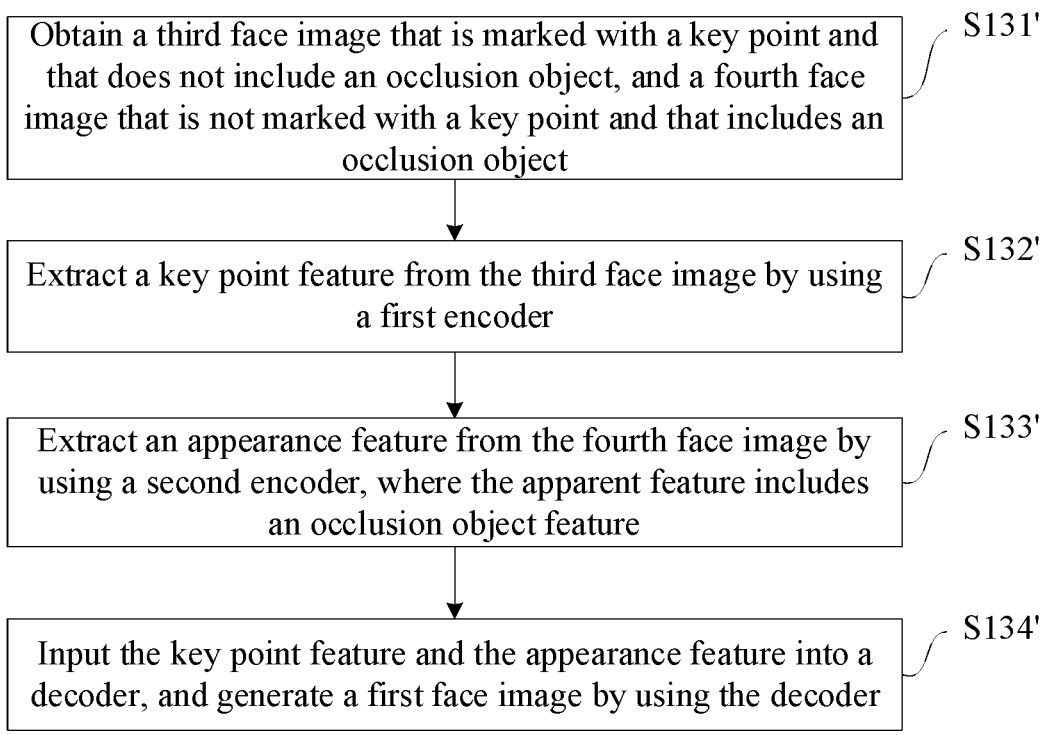
FIG. 4 is another schematic flowchart of synthesizing a first face image according to some embodiments of this application.

FIG. 4 is another schematic flowchart of synthesizing a first face image according to some embodiments of this application. As shown in FIG. 4, step S130 includes:

S131': Obtain a third face image that is marked with a key point and that does not include an occlusion object, and a fourth face image that is not marked with a key point and that includes an occlusion object.

The third face image may be, for example, a front face photo taken without a hat, and each key point is marked in advance. The fourth face image may include a relatively large quantity of occlusion objects, such as a hat, a mask, and glasses. The fourth face image does not need to be marked with the key point in advance.

S132': Extract a key point feature from the third face image by using a first encoder.

The first encoder may be formed by any neural network, such as a convolutional neural network. Because the key point in the third face image has been marked in advance, the key point feature extracted by the first encoder has relatively high accuracy.

S133': Extract an appearance feature from the fourth face image by using a second encoder, where the apparent feature includes an occlusion object feature.

The apparent feature is another feature in the face image other than the key point feature, such as a physical feature, an accessory feature, and an occlusion feature.

S134': Input the key point feature and the appearance feature into a decoder, and generate the first face image by using the decoder.

Figure 5:
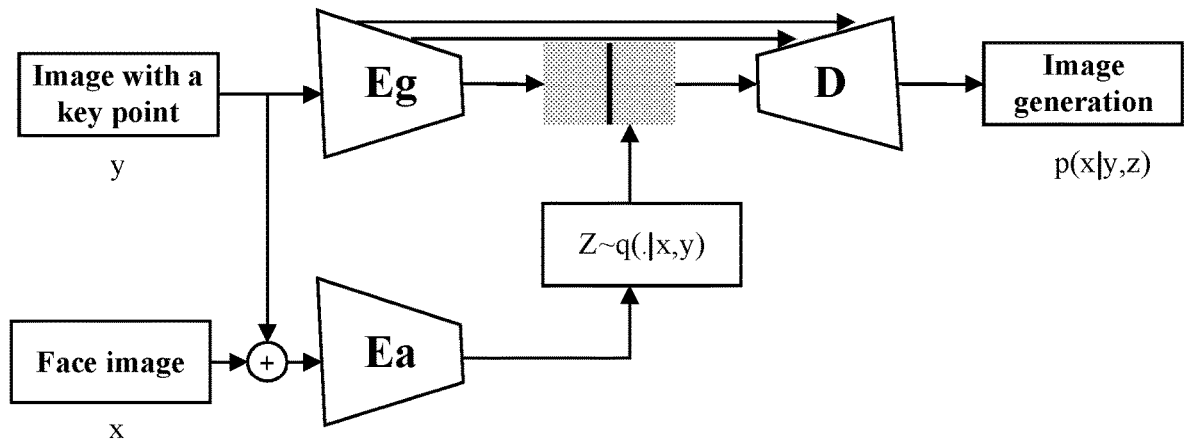
FIG. 5 is a schematic network diagram of synthesizing a first face image by using an encoder and a decoder according to some embodiments of this application.

FIG. 5 is a schematic network diagram of synthesizing a first face image by using an encoder and a decoder according to some embodiments of this application. As shown in FIG. 5, Eg represents the first encoder, configured to extract the key point feature. Ea represents the second encoder, configured to extract the appearance feature. D represents the decoder, configured to synthesize the key point feature extracted by Eg and the appearance feature extracted by Ea, to finally generate the first face image.

In some embodiments, the extracted key point feature and the appearance feature are restored to the first face image by using the decoder. It may be understood that the key point feature in the first face image comes from the third face image, and the appearance feature in the first face image comes from the fourth face image. The appearance feature in the first face image includes a relatively large quantity of occlusion features. In this way, the first face image added with the occlusion object is constructed.

It should be noted that, when the first face image is synthesized by using the decoder and the encoder, position coordinates of the face key point are known, but coordinates of the occlusion object are unknown. In this case, a face part or a facial feature part in a picture needs to be further recognized by using an existing facial feature segmentation algorithm. In this case, an unrecognized part in the face image is a position of the occlusion object. On a basis that the position of the occlusion object is determined, it may be further determined which face key point is occluded and which is not occluded.

Figure 6:
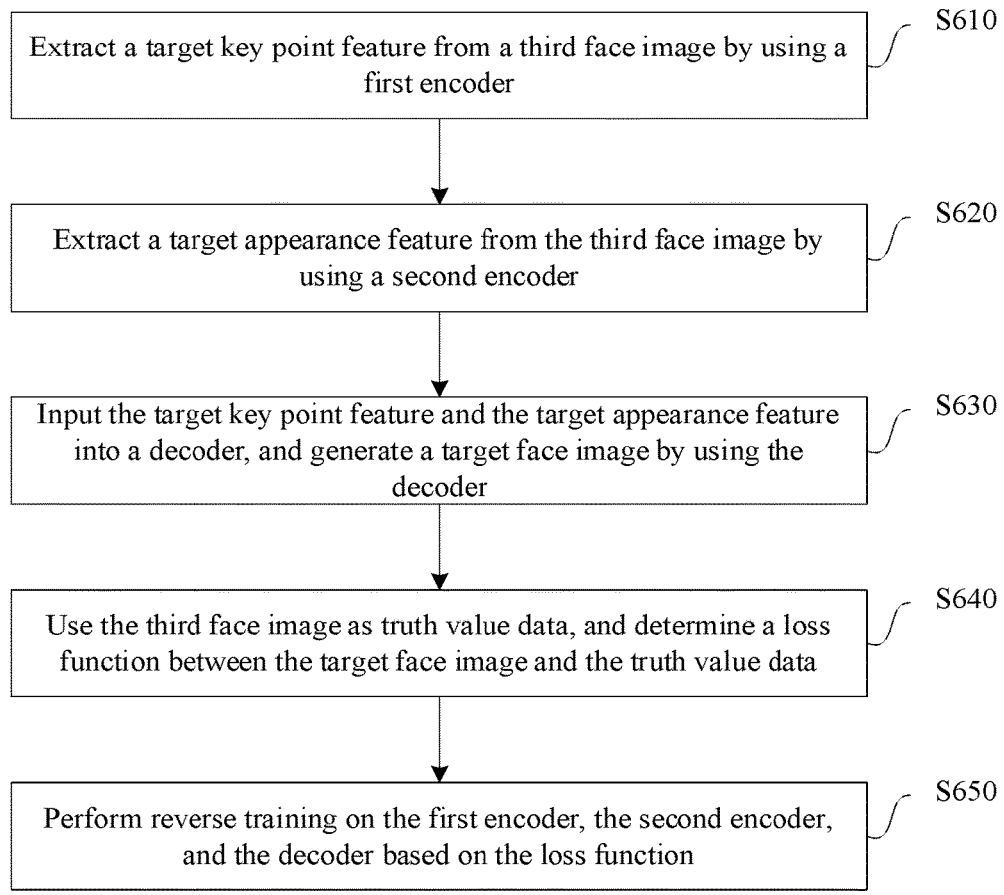
FIG. 6 is a schematic flowchart of training a first encoder, a second encoder, and a decoder according to some embodiments of this application.

FIG. 6 is a schematic flowchart of training a first encoder, a second encoder, and a decoder according to some embodiments of this application. As described in FIG. 6, a neural network including the first encoder, the second encoder, and the decoder is obtained by training through the following steps:

S610: Extract a target key point feature from the third face image by using the first encoder. This step is used to train a capability of the first encoder to extract the key point feature.

S620: Extract a target appearance feature from the third face image by using the second encoder. This step is used to train a capability of the second encoder to extract the appearance feature.

S630: Input the target key point feature and the target appearance feature into the decoder, and generate a target face image by using the decoder. This step is used to train a capability of the decoder to synthesize an image based on the key point feature and the appearance feature.

S640: Use the third face image as truth value data, and determine a loss function between the target face image and the truth value data.

In some embodiments, a loss function L may be represented by using the following formula:

$$L = -KL(q(z|x), p(z|y)) + \|x - G(Ea + Eg)\|_2^2$$

In the foregoing formula, x represents the third face image, y represents the key point feature in the third face image, z represents the appearance feature in the third face image, G (Ea+Eg) represents the target face image generated by the decoder, q represents a distribution probability of prediction data, p represents a distribution probability of truth value data, and KL represents a divergence function.

S650: Perform reverse training on the first encoder, the second encoder, and the decoder based on the loss function.

By using the foregoing process, accuracy of the first encoder and the second encoder extracting a feature and accuracy of the decoder restoring an image are improved, so that a large quantity of first face images added with occlusion objects and determined key points are synthesized.

Figure 7:
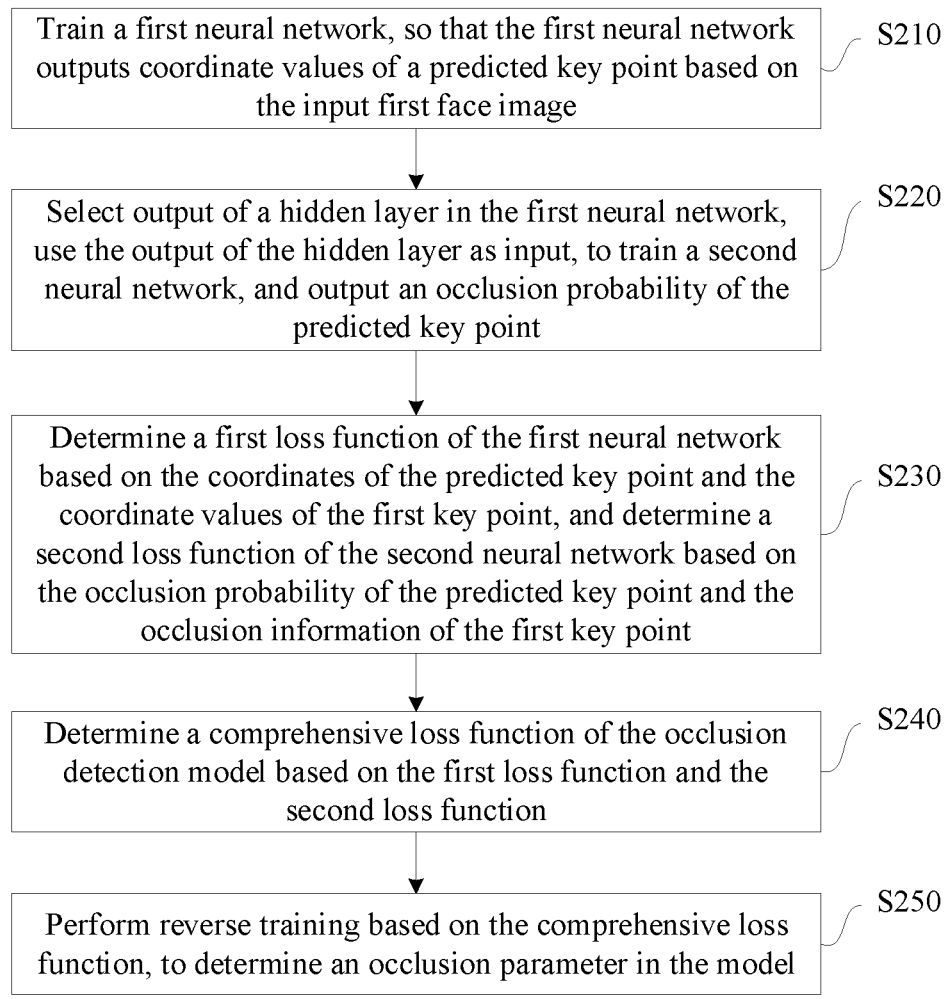
FIG. 7 is a schematic flowchart of training an occlusion detection model according to some embodiments of this application.

FIG. 7 is a schematic flowchart of training an occlusion detection model according to some embodiments of this application. As shown in FIG. 7, step S200 includes: S210: Train a first neural network, so that the first neural network outputs coordinate values of a predicted key point based on the input first face image.

The first neural network may be any existing neural network model. For example, for a mobile terminal, a model such as MobileNet or ShuffleNet may be selected, and for a cloud terminal, a model such as ResNet or Inception may be selected. This is not limited in this application. Based on the foregoing description in which the first face image and the coordinate values of the first key point are obtained, the first face image is used as the input data, and the coordinate values of the first key point is used as truth value data, to train the first neural network, so that the first neural network outputs the coordinate values of the predicted key point that is relatively close to the coordinate values of the first key point.

S220: Select output of a hidden layer in the first neural network, use the output of the hidden layer as input, to train a second neural network, and output an occlusion probability of the predicted key point.

It may be understood that any neural network includes an input layer, an output layer, and a hidden layer, and a quantity of the hidden layer may be set to be one or more based on an actual requirement. In this step, output data of one hidden layer is selected, the output data of the hidden layer is used as an input layer of the second neural network, and the occlusion information of the first key point obtained in the foregoing description is used as the truth data, to train the second neural network, so that the second neural network outputs the occlusion probability of the predicted key point that is relatively close to the occlusion information of the first key point. The occlusion probability may be any value between [0, 1], and a larger value indicates a larger probability of a corresponding predicted key point being occluded.

Similarly, the second neural network may be any existing neural network model. For example, for a mobile terminal, a model such as MobileNet or ShuffleNet may be selected, and for a cloud terminal, a model such as ResNet or Inception may be selected. This is not limited in this application.

Figure 8:
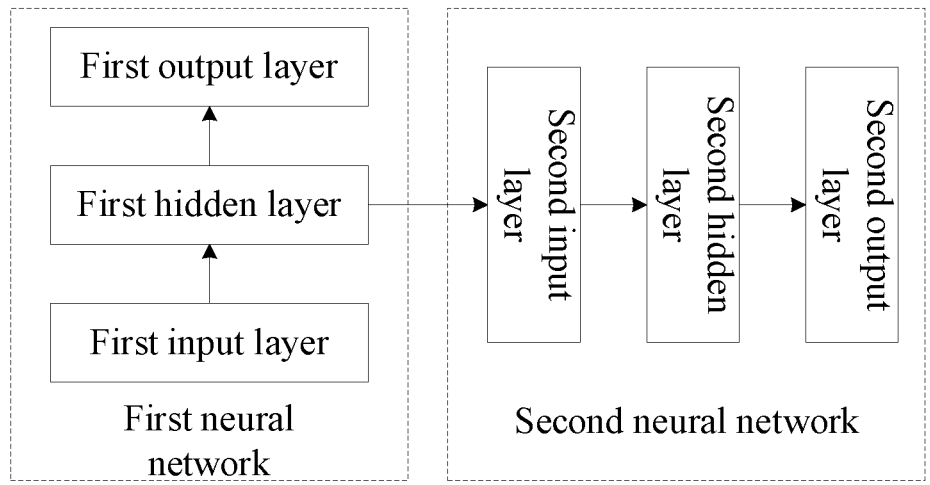
FIG. 8 is a schematic diagram of a structure of a first neural network and a second neural network according to some embodiments of this application.

FIG. 8 is a schematic diagram of a structure of a first neural network and a second neural network according to some embodiments of this application.

As shown in FIG. 8, the first neural network includes a first input layer, a first hidden layer, and a first output layer, and the second neural network includes a second input layer, a second hidden layer, and a second output layer. In a training phase, the first input layer is used to receive the input first face image, and the first output layer is used to output the coordinate values of the predicted key point included in the first face image. The first hidden layer may include one or more layers, and output of one of the hidden layers is used as input to the second hidden layer, to output the occlusion probability of the predicted key point by using the second hidden layer.

Through the foregoing structure, two neural networks are used to construct the occlusion detection model that can obtain two different sets of output results based on one set of input data, so that the coordinates of the key point in the face image and the occlusion probability of the key point can be predicted simultaneously.

S230: Determine a first loss function of the first neural network based on the coordinates of the predicted key point and the coordinate values of the first key point, and determine a second loss function of the second neural network based on the occlusion probability of the predicted key point and the occlusion information of the first key point.

The loss function represents a difference between predicted data and truth value data. In some embodiments, the occlusion detection model is constructed by using the first neural network and the second neural network, and the first loss function and the second loss function are correspondingly generated.

S240: Determine a comprehensive loss function of the occlusion detection model based on the first loss function and the second loss function.

It may be understood that, the comprehensive loss function of the occlusion detection model is constructed by using both the first loss function and the second loss function. For example, a comprehensive loss function loss is determined by the following formula:

$$\text{loss} = \lambda 1 * \sum_{i}^{n} \sqrt{p_i} * l_i + \lambda 2 * o_i$$

$p_i$ represents an occlusion probability of an $i^{th}$ predicted key point, $l_i$ represents the first loss function of the first neural network, $o_i$ represents the second loss function of the second neural network, and $\lambda_1$ and $\lambda_2$ respectively represent empirical parameters. Determining an appropriate comprehensive loss function helps to improve prediction accuracy of the occlusion detection model.

S250: Perform reverse training based on the comprehensive loss function, to determine an occlusion parameter in the model.

Reverse training may be performed on the occlusion detection model by using an optimization algorithm such as a backpropagation algorithm or a gradient descent algorithm, to adjust the occlusion parameter in the occlusion detection model, so that the model's comprehensive loss function of training data sets reaches a relatively small value. The occlusion parameter may be a weight value corresponding to each neuron in the occlusion detection model.

Through the foregoing steps, a relatively ideal occlusion detection model may be obtained. The model can accurately output the coordinate values of the predicted key point and the occlusion probability of the predicted key point based on any input face image.

Figure 9:
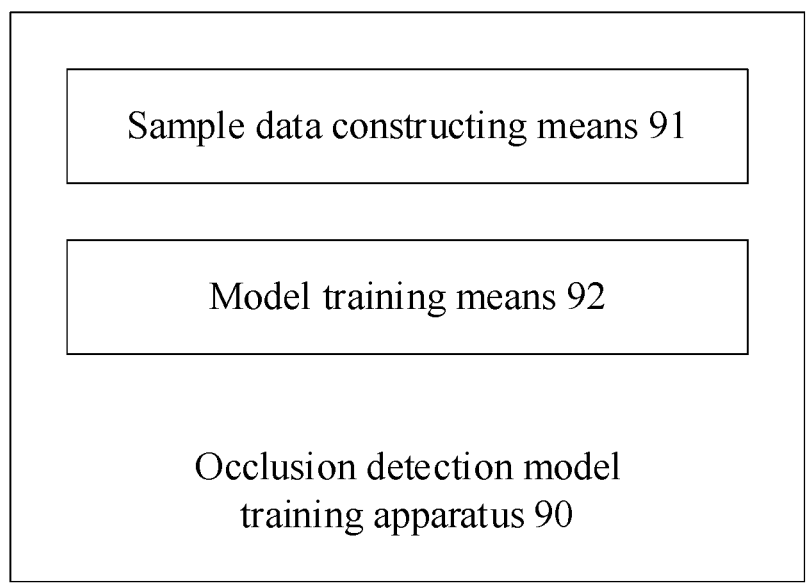
FIG. 9 is a schematic diagram of a program means of an occlusion detection model training apparatus according to some embodiments of this application.

FIG. 9 shows an occlusion detection model training apparatus. In some embodiments, a training apparatus 90 may include or be divided into one or more program means, and the one or more program means are stored in a storage medium and are executed by one or more processors, to complete this application and implement the foregoing occlusion detection model training method. The program means in this application is an instruction segment of a series of computer-readable instructions that can complete a function, and is more suitable than a program for describing an execution process that is of the occlusion detection model training apparatus 90 and that is in the storage medium. The following description describes functions of the program means in some embodiments:

a sample data constructing means 91, applicable to constructing training sample data, where the training sample data includes a first face image added with an occlusion object, coordinate values of a first key point in the first face image, and occlusion information of the first key point; and a model training means 92, applicable to using the first face image as input data, and using the coordinate values of the first key point and the occlusion information of the first key point as output data, to train an occlusion detection model, so that the occlusion detection model outputs, based on any input second face image, coordinate values of a second key point included in the second face image and an occlusion probability of the second key point.

Figure 10:
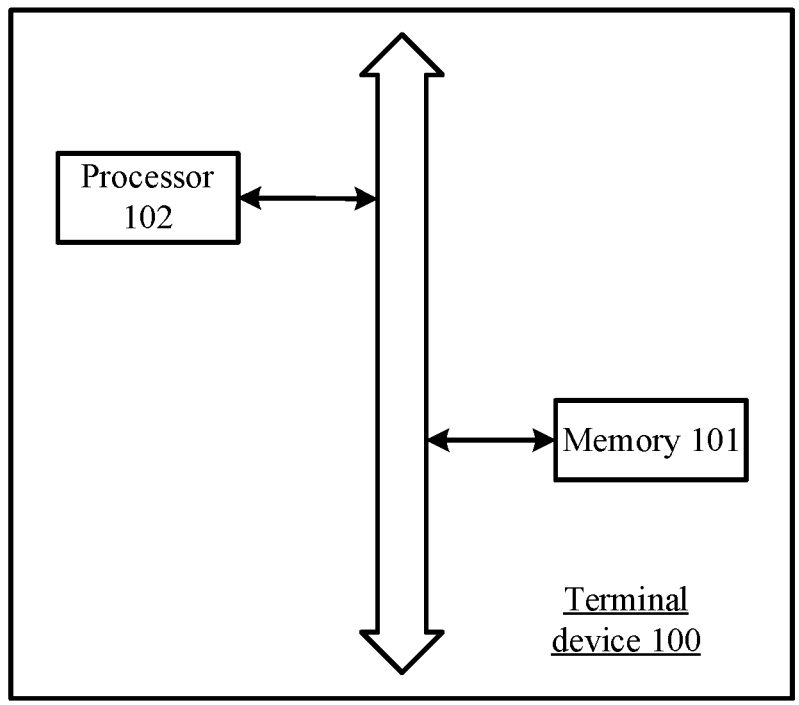
FIG. 10 is a schematic diagram of a hardware structure of an occlusion detection model training apparatus according to some embodiments of this application.

According to some embodiments, this application further provides a computer device, for example, a smartphone, a tablet computer, a notebook computer, a desktop computer, a rack server, a blade server, a tower server, or a cabinet server (including an independent server, or a server cluster formed by a plurality of servers) that can execute a program. As shown in FIG. 10, a computer device 100 in some embodiments at least includes but is not limited to: a memory 101 and a processor 102 that can be communicatively connected to each other by using a system bus. It should be noted that FIG. 10 shows only the computer device 100 with the components 101 and 102. However, it should be understood that implementation of all the shown components is not required, and more or fewer components may be alternatively implemented.

In some embodiments, the memory 101 (that is, a readable storage medium) includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 101 may be an internal storage unit of the computer device 100, such as a hard disk or a memory of the computer device 100. In some other embodiments, the memory 101 may be an external storage device of the computer device 100, for example, a removable hard disk, a smart media card (SMC), a secure digital (SD) card, or a flash card that is disposed on the computer device 100. Certainly, the memory 101 may alternatively include both the internal storage unit of the computer device 100 and the external storage device of the computer device 100. In some embodiments, the memory 101 is generally configured to store an operating system and various application software that are installed on the computer device 100, for example, program code of the occlusion detection model training apparatus 90 according to some embodiments of this application. In addition, the memory 101 may be further configured to temporarily store various types of data that has been output or is to be output.

In some embodiments, the processor 102 may be a central processing unit (CPU), a controller, a microcontroller, a microprocessor, or another data processing chip. The processor 102 is generally configured to control an overall operation of the computer device 100. The processor 102 is configured to run program code stored in the memory 101 or process data, for example, run the occlusion detection model training apparatus 90, to implement the occlusion detection model training method according to some embodiments of this application.

According to some embodiments, this application further provides a computer-readable storage medium. The computer-readable storage medium may be a volatile storage medium, or may be a non-volatile storage medium, such as a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a server, and an App application store. The computer-readable storage medium stores computer-readable instructions, and a corresponding function is implemented when a program is executed by the processor. The computer-readable storage medium in this embodiment is configured to store the occlusion detection model training apparatus 90. When the occlusion detection model training apparatus 90 is executed by the processor, the occlusion detection model training method as described in some embodiments of this application is implemented.

Figure 11:
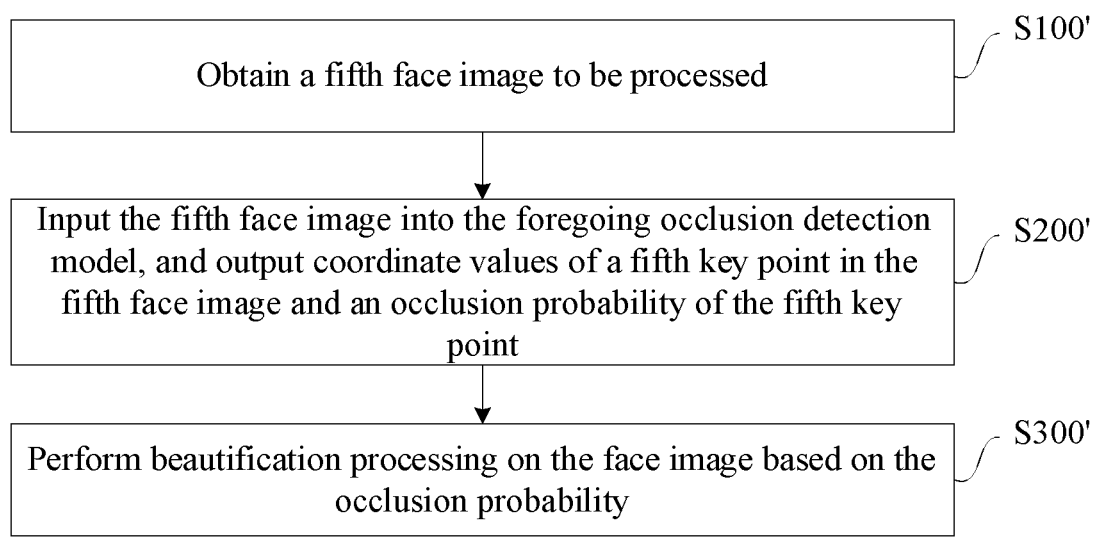
FIG. 11 is a schematic flowchart of a face image beautification processing method according to some embodiments of this application.

Referring to FIG. 11, some embodiments provide a face image beautification processing method, including the following steps:

S100': Obtain a fifth face image to be processed, such as a photo photographed by a user.

S200': Input the fifth face image into the foregoing occlusion detection model, and output coordinate values of a fifth key point in the fifth face image and an occlusion probability of the fifth key point. For example, coordinate positions of a plurality of key points, such as an eye, a nose, a lip, and a jaw in the photo photographed by the user are output, and probabilities that occlusion objects exist at the coordinate positions of the key points are output, for example, whether the eye is occluded, and whether the mouth is occluded.

S300': Perform beautification processing on the face image based on the occlusion probability. For example, beautification processing is applied only to a key point position in which it is determined that no occlusion exists, and is skipped to be performed on a key point position in which it is determined that occlusion exists. For example, when it is detected that the lip of the user is occluded by a mask, color enhancement is not performed on a lip position. When it is detected that an eye position of the user is occluded by sunglasses, contour drawing or the like is not performed on the eye position.

Through the foregoing method, beautification processing of the face image can be more consistent with a real scenario, so that user experience is improved.

Figure 12:
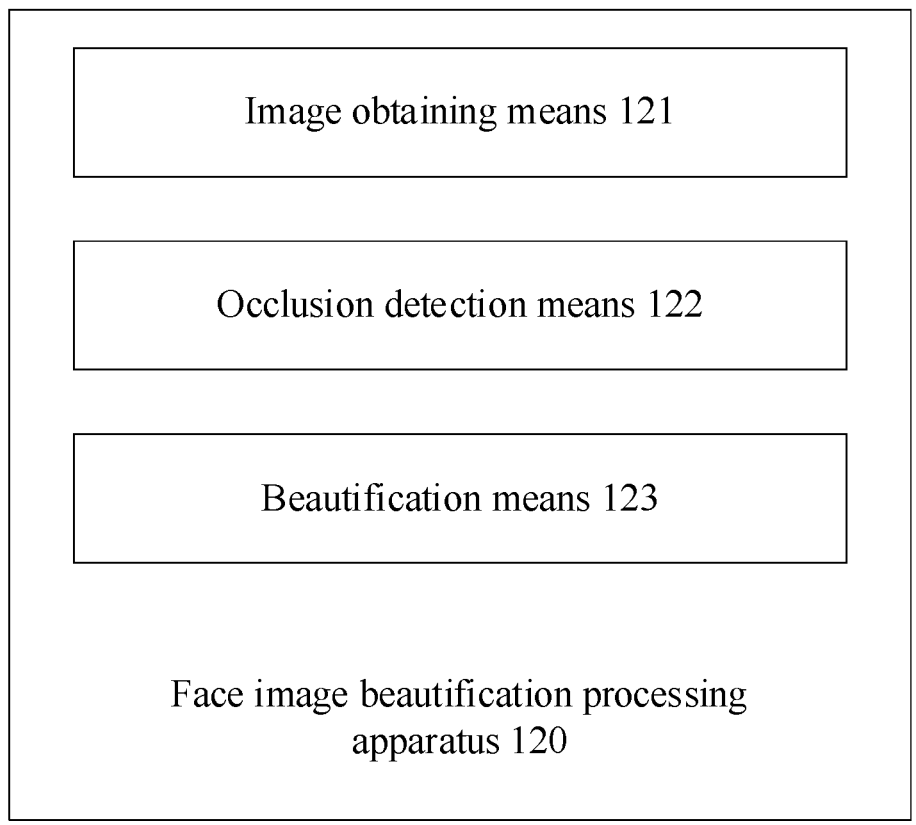
FIG. 12 is a schematic diagram of a program means of a face image beautification processing apparatus according to some embodiments of this application.

FIG. 12 shows a face image beautification processing apparatus 120 according to some embodiments of this application, including:

an image obtaining means 121, applicable to obtaining a third face image to be processed;

an occlusion detection means 122, applicable to inputting the third face image into the foregoing occlusion detection model, and outputting coordinate values of a third key point in the third face image and an occlusion probability of the third key point; and a beautification means 123, applicable to performing beautification processing on the face image based on the occlusion probability.

The sequence numbers of the foregoing embodiments of this application are merely for illustrative purposes, and are not intended to indicate priorities of the embodiments.

Descriptions about any process or method described in a flowchart or in another manner herein may be understood as indicating that one or more modules, segments, or parts of code of an executable instruction that is used to implement a specific logical function or a step of a process are included, the scope of exemplary implementations of this application includes other implementation, and functions may be performed in a sequence other than a shown or discussed sequence, including in a basically simultaneous manner or a reverse sequence according to the functions concerned. This should be understood by a person skilled in the technological field to which the embodiments of this application belong.

A person of ordinary skill in the art may understand that all or some of the steps of the method embodiments may be implemented by a program instructing relevant hardware. The program may be stored in a computer readable medium. When the program runs, one or a combination of the steps of the method embodiments is performed.

In descriptions in this application, descriptions about such reference terms as "an embodiment", "some embodiments", "an example", "a specific example", and "some examples" mean that specific features, structures, materials, or characteristics described with reference to the embodiments or examples are included in at least one embodiment or example of this application. In this application, the foregoing example expressions of the terms are not necessarily with respect to a same embodiment or example. In addition, the described specific features, structures, materials, or characteristics may be combined in a proper manner in any one or more of the embodiments or examples.

Based on the foregoing descriptions of the implementations, a person skilled in the art may clearly understand that the method of the foregoing embodiments may be implemented by software in addition to a necessary universal hardware platform or by hardware only. In most circumstances, the method of the foregoing embodiments may be implemented by software in addition to a necessary universal hardware platform.

The foregoing descriptions are merely exemplary embodiments of this application, and are not intended to limit the scope of this application. Any equivalent structure or equivalent process change made by using the content of the application and the accompanying drawings of this application, or when directly or indirectly applied to other related technical fields, shall fall within the protection scope of this application.

What is claimed is:

1. A method, comprising: constructing a plurality of pieces of training sample data, wherein the training sample data comprises a first face image added with an occlusion object, coordinate values of a first key point in the first face image, and occlusion information of the first key point; and using the first face image as input data, and using the coordinate values of the first key point and the occlusion information of the first key point as output data, to train an occlusion detection model, so that the occlusion detection model outputs, based on any input second face image, coordinate values of a second key point comprised in the second face image and an occlusion probability of the second key point; and wherein the constructing a plurality of pieces of training sample data comprises: obtaining an original face image that does not comprise the occlusion object; obtaining an original occlusion object image that comprises the occlusion object, and extracting a target occlusion object from the original occlusion object image; synthesizing the target occlusion object and the face image, to obtain the first face image added with the occlusion object; and recording the coordinate values of the first key point in the first face image and occlusion information of each first key point.

2. The method according to claim 1, wherein the obtaining an original occlusion object image that comprises the occlusion object, and extracting a target occlusion object from the original occlusion object image comprises:

obtaining a segmentation contour of the target occlusion object based on an image segmentation technology; and performing convolution calculation by using the segmentation contour and the original occlusion object image, to obtain the target occlusion object.

3. The method according to claim 1, wherein the synthesizing the target occlusion object and the face image, to obtain the first face image added with the occlusion object comprises:

selecting a first object from the target occlusion object;

selecting a second object from any position in the face image, wherein a size and a shape of the second object are the same as those of the first object; and replacing a pixel value of a corresponding pixel in the second object with a pixel value of each pixel comprised in the first object.

4. The method according to claim 1, wherein the synthesizing the target occlusion object and the face image, to obtain the first face image added with the occlusion object comprises:

selecting a target object from the occlusion object image, and performing random transformation on the target object, to obtain a first object;

selecting a second object from any position in the face image, wherein a size and a shape of the second object are the same as those of the first object; and replacing a pixel value of a corresponding pixel in the second object with a pixel value of each pixel comprised in the first object.

5. The method according to claim 1, wherein the constructing a plurality of pieces of training sample data comprises:

obtaining a third face image that is marked with a key point and that does not comprise an occlusion object, and a fourth face image that is not marked with a key point and that comprises an occlusion object;

extracting a key point feature from the third face image by using a first encoder;

extracting an appearance feature from the fourth face image by using a second encoder, wherein the apparent feature comprises an occlusion object feature; and inputting the key point feature and the appearance feature into a decoder, and generating the first face image by using the decoder.

6. The method according to claim 5, wherein the first encoder, the second encoder, and the decoder are obtained by training through:
- extracting a target key point feature from the third face image by using the first encoder;
- extracting a target appearance feature from the third face image by using the second encoder;
- inputting the target key point feature and the target appearance feature into the decoder, and generating a target face image by using the decoder;
- using the third face image as truth value data, and determining a loss function between the target face image and the truth value data; and
- performing reverse training on the first encoder, the second encoder, and the decoder based on the loss function.

7. The method according to claim 1, wherein the using the first face image as input data, and using the coordinate values of the first key point and the occlusion information of the first key point as output data, to train an occlusion detection model comprise:
- training a first neural network, so that the first neural network outputs coordinate values of a predicted key point based on the input first face image;
- selecting output of a hidden layer in the first neural network, using the output of the hidden layer as input, to train a second neural network, and outputting an occlusion probability of the predicted key point;
- determining a first loss function of the first neural network based on the coordinates of the predicted key point and the coordinate values of the first key point, and determining a second loss function of the second neural network based on the occlusion probability of the predicted key point and the occlusion information of the first key point;
- determining a comprehensive loss function of the occlusion detection model based on the first loss function and the second loss function; and
- performing reverse training based on the comprehensive loss function, to determine an occlusion parameter in the model.

8. The method according to claim 7, wherein an expression of the comprehensive loss function is:

$$\text{loss} = \lambda 1 * \sum_{i}^{n} \sqrt{p_i} * l_i + \lambda 2 * o_i$$

$p_i$ represents an occlusion probability of an $i^{th}$ predicted key point, $l_i$ represents the first loss function of the first neural network, $o_i$ represents the second loss function of the second neural network, and $\lambda_1$ and $\lambda_2$ respectively represent empirical parameters.

9. The method according to claim 1, further comprising: obtaining a fifth face image to be processed;
- inputting the fifth face image into the occlusion detection model, and outputting coordinate values of a fifth key point in the fifth face image and an occlusion probability of the fifth key point; and
- performing beautification processing on the face image based on the occlusion probability.

10. A computer device, comprising a memory, a processor, and computer-readable instructions that are stored in the memory and that are capable of being run by the processor, wherein when executing the instructions, the processor perform operations comprising: constructing a plurality of pieces of training sample data, wherein the training sample data comprises a first face image added with an occlusion object, coordinate values of a first key point in the first face image, and occlusion information of the first key point; and using the first face image as input data, and using the coordinate values of the first key point and the occlusion information of the first key point as output data, to train an occlusion detection model, so that the occlusion detection model outputs, based on any input second face image, coordinate values of a second key point comprised in the second face image and an occlusion probability of the second key point; and wherein the constructing a plurality of pieces of training sample data comprises: obtaining an original face image that does not comprise the occlusion object; obtaining an original occlusion object image that comprises the occlusion object, and extracting a target occlusion object from the original occlusion object image; synthesizing the target occlusion object and the face image, to obtain the first face image added with the occlusion object; and recording the coordinate values of the first key point in the first face image and occlusion information of each first key point.

11. The computing device according to claim 10, wherein the obtaining an original occlusion object image that comprises the occlusion object, and extracting a target occlusion object from the original occlusion object image comprises:
- obtaining a segmentation contour of the target occlusion object based on an image segmentation technology; and
- performing convolution calculation by using the segmentation contour and the original occlusion object image, to obtain the target occlusion object.

12. The computing device according to claim 10, wherein the synthesizing the target occlusion object and the face image, to obtain the first face image added with the occlusion object comprises:
- selecting a first object from the target occlusion object;
- selecting a second object from any position in the face image, wherein a size and a shape of the second object are the same as those of the first object; and
- replacing a pixel value of a corresponding pixel in the second object with a pixel value of each pixel comprised in the first object.

13. The computing device according to claim 10, wherein the synthesizing the target occlusion object and the face image, to obtain the first face image added with the occlusion object comprises:
- selecting a target object from the occlusion object image, and performing random transformation on the target object, to obtain a first object;
- selecting a second object from any position in the face image, wherein a size and a shape of the second object are the same as those of the first object; and
- replacing a pixel value of a corresponding pixel in the second object with a pixel value of each pixel comprised in the first object.

14. The computing device according to claim 10, wherein the constructing a plurality of pieces of training sample data comprises:
- obtaining a third face image that is marked with a key point and that does not comprise an occlusion object, and a fourth face image that is not marked with a key point and that comprises an occlusion object;
- extracting a key point feature from the third face image by using a first encoder;
- extracting an appearance feature from the fourth face image by using a second encoder, wherein the apparent feature comprises an occlusion object feature; and inputting the key point feature and the appearance feature into a decoder, and generating the first face image by using the decoder.

15. The computing device according to claim 14, wherein the first encoder, the second encoder, and the decoder are obtained by training through:
   extracting a target key point feature from the third face image by using the first encoder;
   extracting a target appearance feature from the third face image by using the second encoder;
   inputting the target key point feature and the target appearance feature into the decoder, and generating a target face image by using the decoder;
   using the third face image as truth value data, and determining a loss function between the target face image and the truth value data; and
   performing reverse training on the first encoder, the second encoder, and the decoder based on the loss function.

16. The computing device according to claim 10, wherein the using the first face image as input data, and using the coordinate values of the first key point and the occlusion information of the first key point as output data, to train an occlusion detection model comprise:
   training a first neural network, so that the first neural network outputs coordinate values of a predicted key point based on the input first face image;
   selecting output of a hidden layer in the first neural network, using the output of the hidden layer as input, to train a second neural network, and outputting an occlusion probability of the predicted key point;
   determining a first loss function of the first neural network based on the coordinates of the predicted key point and the coordinate values of the first key point, and determining a second loss function of the second neural network based on the occlusion probability of the predicted key point and the occlusion information of the first key point;
   determining a comprehensive loss function of the occlusion detection model based on the first loss function and the second loss function; and
   performing reverse training based on the comprehensive loss function, to determine an occlusion parameter in the model.

17. The computing device according to claim 10, wherein when executing the instructions, the processor further perform operations comprising:
   obtaining a fifth face image to be processed;
   inputting the fifth face image into the occlusion detection model, and outputting coordinate values of a fifth key point in the fifth face image and an occlusion probability of the fifth key point; and
   performing beautification processing on the face image based on the occlusion probability.

18. A non-transitory computer-readable storage medium, wherein the non-transitory computer-readable storage medium stores computer-readable instructions, which when executed by a processor, cause the processor to perform operations comprising: constructing a plurality of pieces of training sample data, wherein the training sample data comprises a first face image added with an occlusion object, coordinate values of a first key point in the first face image, and occlusion information of the first key point; and using the first face image as input data, and using the coordinate values of the first key point and the occlusion information of the first key point as output data, to train an occlusion detection model, so that the occlusion detection model outputs, based on any input second face image, coordinate values of a second key point comprised in the second face image and an occlusion probability of the second key point; and wherein the constructing a plurality of pieces of training sample data comprises: obtaining an original face image that does not comprise the occlusion object; obtaining an original occlusion object image that comprises the occlusion object, and extracting a target occlusion object from the original occlusion object image; synthesizing the target occlusion object and the face image, to obtain the first face image added with the occlusion object; and recording the coordinate values of the first key point in the first face image and occlusion information of each first key point.

* * * * *